United States Patent
Takagi et al.

[11] Patent Number: 5,735,569
[45] Date of Patent: Apr. 7, 1998

[54] STRUCTURE FOR ATTACHING ASSIST GRIP FOR AUTOMOBILE

[75] Inventors: Masahiro Takagi; Masaaki Takagi, both of Fujisawa; Katsumi Obata, Zama, all of Japan

[73] Assignee: Nissan Motor Co., Ltd., Kanagawa, Japan

[21] Appl. No.: 649,532

[22] Filed: May 17, 1996

[30] Foreign Application Priority Data

May 18, 1995 [JP] Japan .................. 7-119708

[51] Int. Cl.⁶ .................................................. B62D 25/06
[52] U.S. Cl. .................................................. 296/210
[58] Field of Search .................................. 296/210, 214; 248/300, 352

[56] References Cited

U.S. PATENT DOCUMENTS

| | | | |
|---|---|---|---|
| 4,254,986 | 3/1981 | Nakamura | 296/210 |
| 4,981,322 | 1/1991 | Dowd et al. | 296/214 |
| 4,981,323 | 1/1991 | Dowd et al. | 296/214 |
| 5,018,781 | 5/1991 | Kumasaka et al. | 296/210 |
| 5,052,743 | 10/1991 | Inada et al. | 296/210 |
| 5,120,593 | 6/1992 | Kurihara | 428/174 |
| 5,269,060 | 12/1993 | Dowd et al. | 29/897.2 |
| 5,318,338 | 6/1994 | Ikeda | 296/210 |
| 5,403,064 | 4/1995 | Mahler et al. | 296/214 |
| 5,484,186 | 1/1996 | Van Order et al. | 296/97.5 |
| 5,519,917 | 5/1996 | Cordonnier | 16/110 R |

FOREIGN PATENT DOCUMENTS

| | | | |
|---|---|---|---|
| 62-12476 | 1/1987 | Japan | 296/210 |
| 2-182585 | 7/1990 | Japan | 296/214 |
| 4-297340 | 10/1992 | Japan | |
| 2220392 | 1/1990 | United Kingdom | 296/214 |

*Primary Examiner*—Gary C. Hoge
*Attorney, Agent, or Firm*—Lowe, Price, LeBlanc & Becker

[57] ABSTRACT

The bracket has flange portions at two vertical ends so as to be supported by the inner panel of a roof rail and a projecting portion formed to expand to have a predetermined space from a main plane of the inner panel, the support portions of the assist grip are disposed on the projecting portion at predetermined vertical intervals, the projecting portion has a plurality of first openings formed by raising tag portions between the support portions of the assist grip and on the outside of the support portions of the assist grip by cutting toward the main plane of the inner panel, and free ends of the tag portions are positioned to have predetermined gaps from the main plane of the inner panel.

7 Claims, 5 Drawing Sheets

1

STRUCTURE FOR ATTACHING ASSIST GRIP FOR AUTOMOBILE

BACKGROUND OF THE INVENTION

The present invention relates to a structure for attaching an assist grip for an automobile.

A structure for attaching an assist grip for an automobile has been, as shown in, for example, FIG. 1 (refer to Japanese Patent Laid-Open No. 4-297340), arranged such that a nut 84 of an inner panel 83 of a roof rail 85 in a shell-like shape formed by welding (the weld is shown by SW in FIG. 1) two flanges 81a and 83a of outer and inner panels 81 and 83 supports a bracket 87a of brackets 87 with a bolt 89. Another bracket 87b extends over the inner panel 83 of the roof rail 85.

A screw 93 is, by means of threads, received by a nut 91 secured to the other bracket 87b of the brackets 87 so that support portions 97 of an assist grip 95 are supported.

Reference numeral 99 represents a molded ceiling member disposed along the inner panel 83 of the roof rail 85 and molded by corrugated cardboard secured by the support portions 97 of the assist grip 95.

Reference numeral 121 represents a welt to be connected to the two flanges 81a and 83a of the corresponding outer panel 81 and the inner panel 83 of the roof rail 85.

In the conventional structure shown in FIG. 2, a nut 127, secured to an inner panel 123 of a roof rail 125 in a shell-like shape formed by welding (the weld is shown by SW in FIG. 2), to each other, two flanges 81a and 123a of corresponding outer and inner panels 81 and 123, receives, by threads, screws 131 through a molded ceiling member 129 made of corrugated cardboard so that support portions 97 of an assist grip 95 are supported.

However, since the foregoing structure for attaching an assist grip for an automobile shown in, for example, FIG. 1, has the arrangement such that only one bracket 87a of the brackets 87 is supported, that is, the same is supported by a cantilever method, there is a risk that the strength with which the bracket 87 is attached is unsatisfactory.

The example shown in FIG. 2 has a risk that confined noise is produced due to planar vibrations of the attachment surface 123a of the inner panel 123 when the automobile is driven. In the foregoing case, passengers will be given an unpleasant feeling.

In both of the foregoing conventional examples, a space given reference numeral 133 exists between the ceiling member 99 or 129 and the inner panel 83 or 123. Therefore, if the ceiling member 99 or 129 is pushed with the finger, there is a fear that the surface of the ceiling member 89 or 129 is felt baggy.

SUMMARY OF THE INVENTION

In view of the foregoing, an object of the present invention is to provide a structure for attaching an assist grip for an automobile in which the structure of a bracket is strengthened to enable vibrations of the surface to which an assist grip is attached to be tuned appropriately and to prevent baggy feeling of a molded ceiling member.

To solve the foregoing problems according to the present invention, there is provided a structure for attaching an assist grip for an automobile having a roof rail in a shell-like shape formed by welding two flanges of an outer panel and an inner panel, a bracket supported by the inner panel of the roof rail and having support portions for supporting the assist grip onto the inner panel, a ceiling member for covering portions of the roof rail and bracket facing inside of the automobile, and the assist grip supported at the support portions thereof through the ceiling member, wherein the bracket has flange portions at two vertical ends so as to be supported by the inner panel and a projecting portion formed to expand to have a predetermined space from a main plane of the inner panel, the support portions of the assist grips are disposed on the projecting portion at predetermined vertical intervals, the projecting portion has a plurality of first openings formed by raising tag portions between the support portions of the assist grip and on the outsides of the support portion of the assist grip by cutting toward the main plane of the inner panel, and free ends of the tag portions are positioned to have predetermined gaps from the main plane of the inner panel.

Since the structure according to the present invention has roof rail in a shell-like shape formed by welding two flanges of an outer panel and an inner panel, a bracket supported by the inner panel of the roof rail and having support portions for supporting the assist grip onto the inner panel, a ceiling member for covering portions of the roof rail and bracket facing inside of the automobile, and the assist grip supported at the support portions thereof through the ceiling member, wherein the bracket has flange portions at two vertical ends so as to be supported by the inner panel and a projecting portion formed to expand to have a predetermined space from a main plane of the inner panel, the support portions of the assist grips are disposed on the projecting portion at predetermined vertical intervals, the projecting portion has a plurality of first openings formed by raising tag portions between the support portions of the assist grip and on the outsides of the support portion of the assist grip by cutting toward the main plane of the inner panel, and free ends of the tag portions are positioned to have predetermined gaps from the main plane of the inner panel, the inner panel can reliably be supported by the flange portions at the two vertical ends of the bracket. The support portions of the assist grip are supported by the projecting portion of the bracket so that vibrations of the projecting portion of the bracket are appropriately tuned due to the first openings formed, at predetermined intervals, in the support portion. Since the free ends of the tag portions of the bracket are formed to have the predetermined gap from the main plane of the inner panel, the free ends are not in contact with the main plane of the inner panel so that noise, which can be generated due to rubbing, is prevented. Thus, rigidity can reliably be intensified in such a manner that elastic deformation takes place to prevent plastic deformation.

The gap from the free ends of the tag portions to the main plane of the inner panel may be ⅙ of the length of the space from the main plane of the inner panel to the projecting portion of the bracket. As a result, the free ends of the tag portions of the bracket are not in contact with the main plane of the inner panel so that noise, which can be generated due to rubbing, is prevented. Thus, rigidity can reliably be intensified in such a manner that elastic deformation takes place to prevent plastic deformation.

Beads may be formed on the base portions of the tag portions of the bracket. As a result, the shape of the tag portions of the bracket can reliably be maintained.

The first openings of the bracket can be formed substantially coaxially with the second opening formed in the inner panel of the roof rail.

As a result, the spot-welding gun can smoothly be inserted through the first openings of the bracket and the second opening of the inner panel of the roof rail.

Moreover, a shelf portion may be formed in the boundary portion between the upper flange of the bracket welded to the inner panel of the roof rail and the projecting portion of the bracket.

As a result, even if an input of collision is made due to collision of a passenger in the automobile against the roof rail, the projecting portion of the bracket is moved because the shelf portion can easily be deformed. Thus, impact energy can easily be absorbed.

An expanded portion may be formed toward the ceiling member along the edge line between the lower flange of the bracket and the projecting portion of the bracket.

As a result, if the ceiling member is pushed from inside of the automobile, the expanded portion of the bracket is moved toward the ceiling member so that the inner surface of the ceiling member interferes with the expanded portion of the bracket. Therefore, baggy feeling can be prevented.

Other objects, features and advantages of the invention will be evident from the following detailed description of the preferred embodiments described in conjunction with the attached drawings.

DESCRIPTION OF THE PREFERRED EMBODIMENTS

Figure 1:
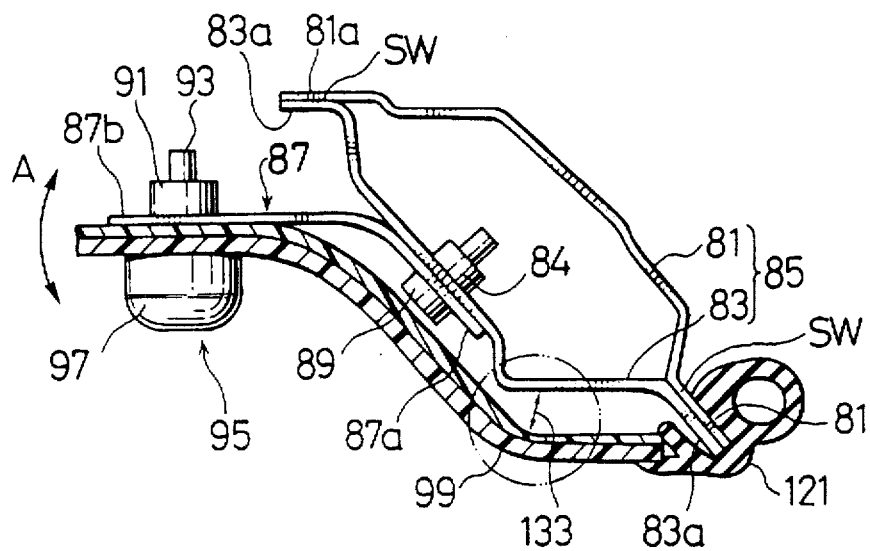
FIG. 1 is a cross sectional view of explanatory of a conventional structure.
Figure 2:
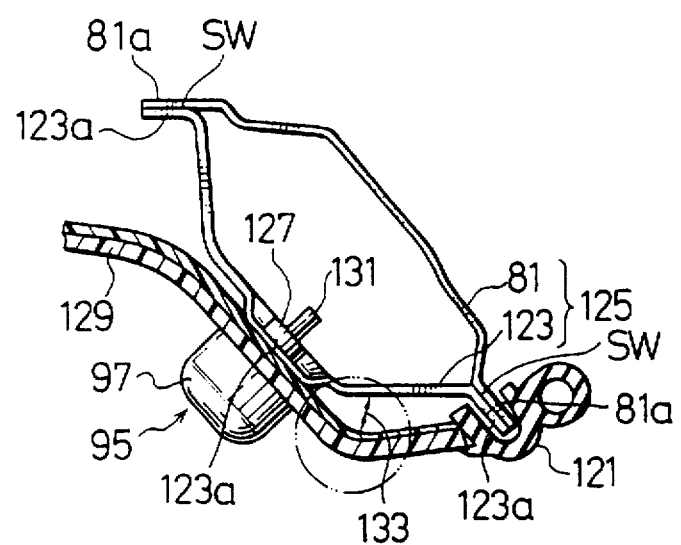
FIG. 2 is a cross sectional view of explanatory of another conventional structure.
Figure 3:
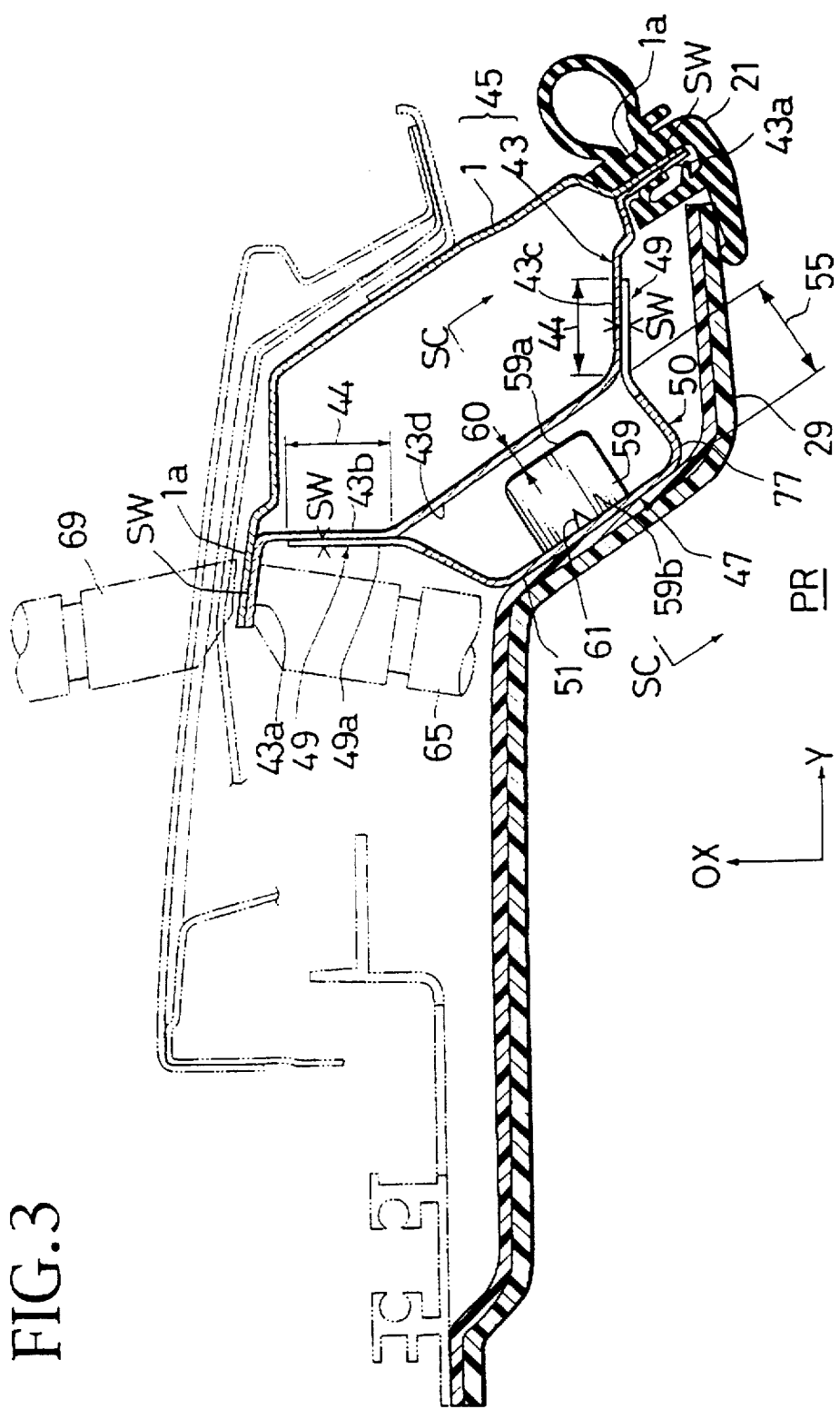
FIG. 3 is a cross sectional view taken along line SA—SA shown in FIG. 5 for explaining a structure for attaching a garnish molding for an automobile according to an embodiment of the present invention.

An embodiment of the present invention will now be described with reference to the drawings.

FIG. 3 to 8 show a structure for attaching a garnish molding for an automobile according to an embodiment of the present invention.

Nuts 48 of a bracket 47 secured to an inner panel 43 of a roof rail 45 in a shell-like shape formed by spot-welding (SW) two flanges 1a and 43a of an outer panel 1 and the inner panel 43 to each other receive screws through a molded ceiling member 29 made of corrugated cardboard by means of threads so that support portions 17 of an assist grip 15 are supported.

The bracket 47 comprises flange portions 49 intermittently formed at the two vertical ends of an elongated body 50 having a U-like shape facing side; a projecting portion 51 formed integrally with the body 50; and first openings 53 formed in the projecting portion 51 of the body 50.

Each of the flange portions 49 is formed into a tag shape having a length 44 of about 18 mm so as to be, by spot-welding (SW), supported by two vertical ends 43b and 43c of the inner panel 43.

The two vertical ends 43b and 43c of the inner panel 43 make obtuse angles from a main plane 43d of the inner panel 43 so as to easily be collapsed when an impact is applied from the interior PR of the automobile.

The projecting portion 51 is formed to expand to create a predetermined space 55 (18 mm in this embodiment) from the main plane 43d of the inner panel 43.

The projecting portion 51 has a surface opposite to the main plane 43d of the inner panel 43, the surface having the nuts 48 welded thereto at predetermined intervals for cooperating with the support portions 17 of the assist grip 15.

The plural first openings 53 are formed in the projecting portion 51 between the support portions 17 of the assist grip 15 and on the outside of the support portion 17 of the assist grip 15, the first openings 53 being formed by raising tag portions 59 toward the main plane 43d of the inner panel 43 by cutting.

Each of the tag portions 59 has a predetermined length(15 mm in this embodiment), the tag portion 59 having a free end 59a positioned to have a predetermined gap (3 mm in this embodiment) 60 from the main plane 43d of the inner panel 43.

That is, the gap 60 from the free end 59a of the tag portion 59 of the bracket 47 to the main plane 43d of the inner panel 43 is substantially ⅙ of the length (18 mm in this embodiment) of the space 55 formed by the projecting portion 51 of the bracket 47 projecting over the main plane 43d of the inner panel 43.

The tag portion 59 of the bracket 47 has a base portion 59b on which a bead 61 is formed.

Figure 4:
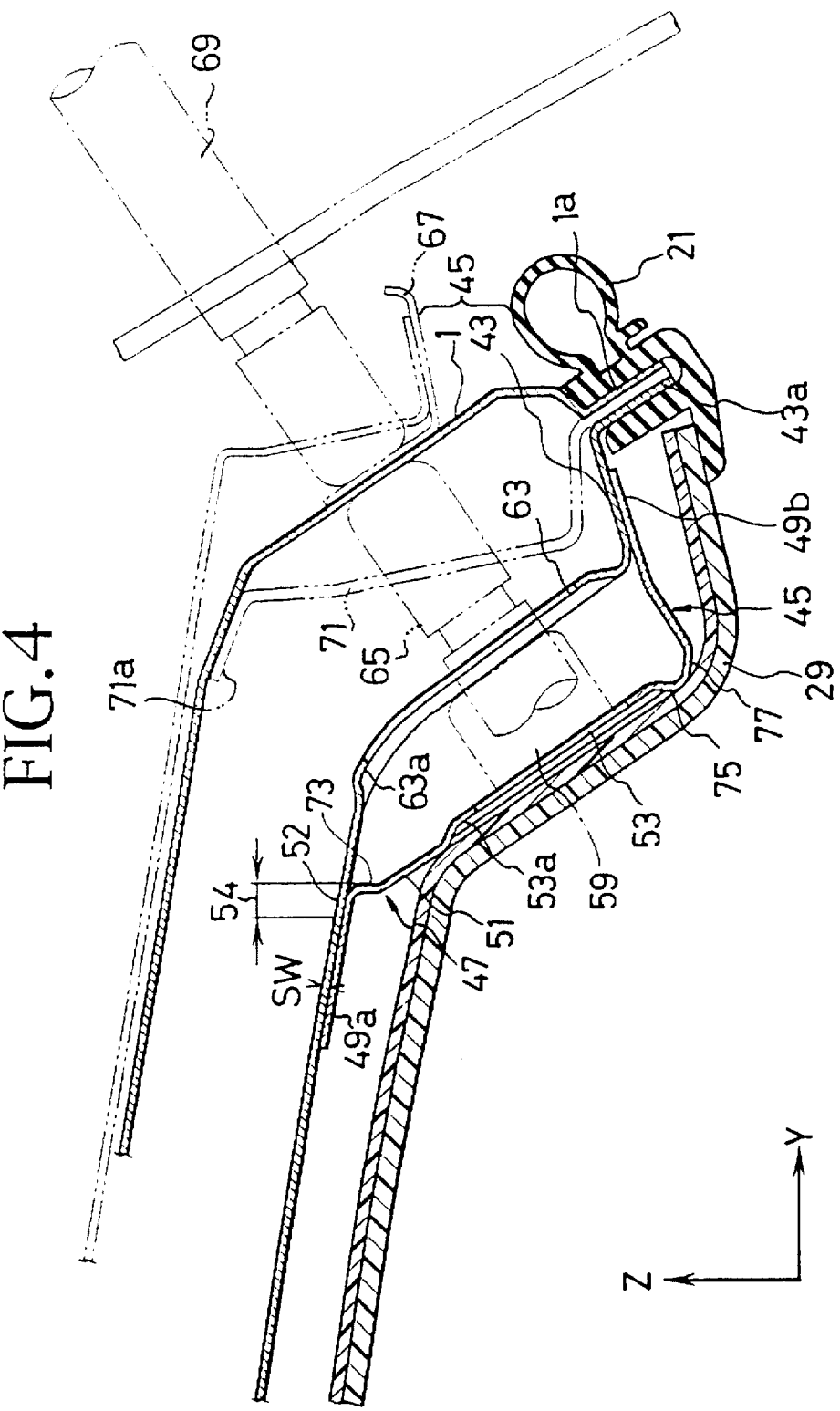
FIG. 4 is an explanatory cross sectional view taken along line SB—SB shown in FIG. 5.
Figure 5:
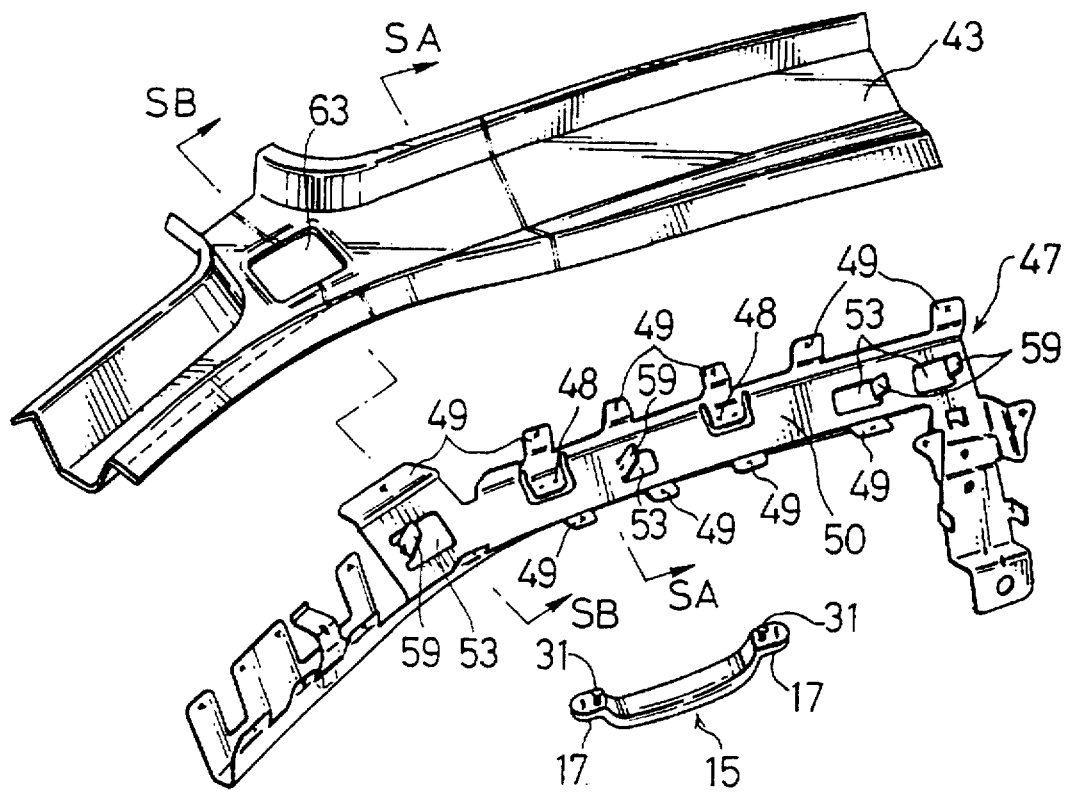
FIG. 5 is an exploded perspective view of a portion in the vicinity of the bracket shown in FIGS. 3 and 4.
Figure 6:
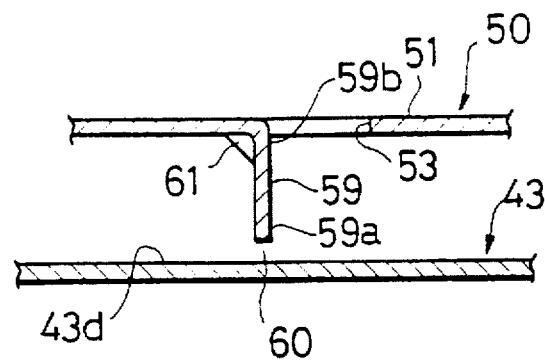
FIG. 6 is an explanatory cross sectional view taken along line SC—SC shown in FIG. 3.

The position of the first openings 53 of the bracket 47 are determined substantially coaxially with second opening 63 formed in the inner panel 43 of the roof rail 45, as shown in FIG. 4.

That is, the second opening 63 is formed to enable a spot-welding gun 65 of the two spot-welding guns 65 and 69 through the first openings 53 and the second opening 63 so that a drip channel 67 is, also by another spot-welding gun 69, spot-welded (SW) to the external surface of the outer panel 1 of the roof rail 45.

The first openings 53 of the bracket 47 and the second opening 63 formed in the inner panel 43 of the roof rail 45 have corresponding lowered portions 53a and 63a lowered toward the outer panel 1 of the roof rail 45.

Reference numeral 71 represents a reinforcement interposed between the inner surface of the flange 1a of the outer panel 1 of the roof rail 45 and that of the flange 43a of the inner panel 43.

Figure 7:
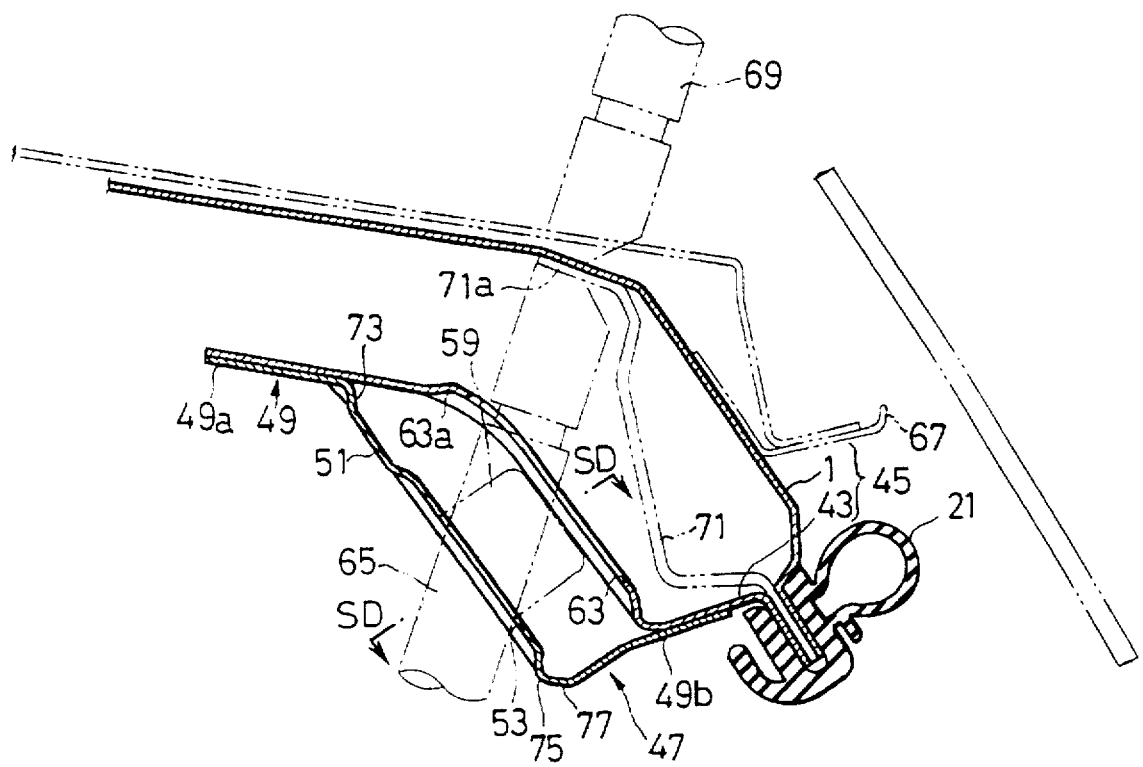
FIG. 7 is an explanatory cross sectional view taken along line SB—SB shown in FIG. 5.
Figure 8:
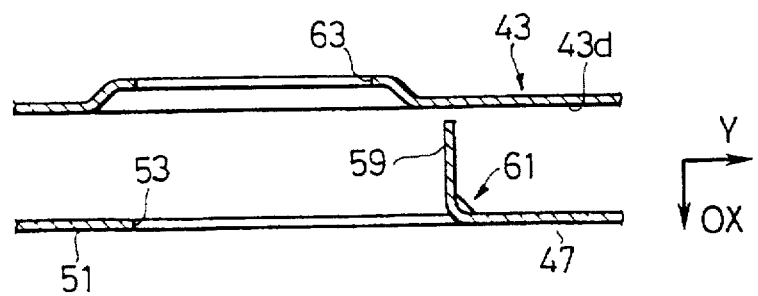
FIG. 8 is an explanatory cross sectional view taken along line SD—SD shown in FIG. 7.

In order to cause an upper flange 71a of the reinforcement 71 to be supported by the inner surface of the outer panel 1 of the roof rail 45, the first openings 53 and the second opening 63 are formed to enable the spot-welding gun 65 to be inserted, as shown in FIG. 7. Thus, the reinforcement 71 is spot-welded (SW) to the outer surface of the outer panel 1 of the roof rail 45 also by the other spot-welding gun 69.

Reference numeral 73 represents a shelf portion, as shown in FIG. 4, formed at the boundary between an upper flange 49a which is either of the flange portion 49 of the bracket 47 spot-welded to the inner panel 43 of the roof rail 45 and the projecting portion 51 of the bracket 47, that is, the shelf portion has a surface outwards (to the right-hand portion in FIG. 4) shifted from an intersection 52 between an extension of the projecting portion 51 and the upper flange portion 49a for a predetermined distance 54, that is, 5 mm. The shelf portion 73 is bent with respect to the extension of the projecting portion 51.

Reference numeral 75 represents an expanded portion formed along an edge line 77 between the lower flange 49b, which is the other flange portion 49 of the bracket 47, and the projecting portion 51 of the bracket 47, the expanded portion 75 being expanded toward the molded ceiling member 29.

As a result, according to this embodiment, the two vertical ends 49a and 49b of the flange portions 49 of the bracket 47 can reliably be supported by the two vertical ends 43b and 43c of the inner panel 43.

The support portions 17 of the assist grip 15 are supported by the projecting portion 51 of the bracket 47 so that vibration tuning of the projecting portion 51 of the bracket 47 is appropriately performed thanks to the first openings 53 formed in the support portions 17 at predetermined longitudinal intervals.

The free end 59a of the tag portion 59 of the bracket 47 is formed to have the gap 60 from the main plane 43d of the inner panel 43, the gap 60 being ⅙ of the length 55 of the space from the main plane 43d of the inner panel 43 to the projecting portion 51 of the bracket 47. Therefore, the free end 59a is not in contact with the main plane 43d of the inner panel 43 so that noise, which can be generated due to rubbing, is prevented. Thus, rigidity can reliably be intensified in such a manner that elastic deformation takes place to prevent plastic deformation.

Moreover, the shape of the tag portion 59 of the bracket 47 can reliably be maintained.

Either of the spot-welding gun 65 of the spot-welding guns 65 and 69 can smoothly be inserted through the first openings 53 of the bracket 47 and the second opening 63 formed in the inner panel 43 of the roof rail 45.

Even if an input of collision is made due to collision of a passenger (omitted from illustration) in the automobile against the roof rail 45, the projecting portion 51 of the bracket 47 is moved because the shelf portion 73 can easily be deformed. Thus, impact energy can easily be absorbed.

If the molded ceiling member 29 is pushed from inside of the automobile, the inner surface of the molded ceiling member 29 interferes with the expanded portion 75 of the bracket 47 because the expanded portion 75 is positioned near the molded ceiling member 29. Therefore, baggy feeling can be prevented.

As described above, the bracket 47 can be formed to have satisfactory strength, vibrations of the support portions 17 for attaching the assist grip 15 can appropriately be tuned, and baggy feeling of the molded ceiling member 29 can be prevented.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A structure for an automobile comprising:

a roof rail having a shell-like shape which is formed by welding flanges of an outer panel and an inner panel together;

a bracket supported by the inner panel of said roof rail, said bracket having connection portions; and an assist grip, said assist grip having support portions which are connected to the connection portions of said bracket, the support portions extending through a ceiling member which covers said roof rail and said bracket; and wherein:

said bracket has flange portions at opposite ends thereof so as to be supported by the inner panel, and a projecting portion which projects a predetermined amount toward a main plane of the inner panel, and wherein:

the connection portions are disposed at predetermined intervals, the projecting portion has a plurality of first openings formed by raising tag portions between the connection portions and on the outside of the connection portions, by cutting toward the main plane of the inner panel, and free ends of the tag portions are each positioned to be spaced from the main plane of the inner panel by a predetermined gap.

2. A structure for an automobile according to claim 1, wherein the gaps from free ends of the tag portions of said bracket to the main plane of the inner panel are about ⅙ of a length of a space between the main plane of the inner panel and the projecting portion of said bracket.

3. A structure for an automobile according to claim 1, wherein the tag portions of said bracket have beads formed on base portions thereof.

4. A structure for an automobile according to claim 1, wherein a bent shelf portion is formed at a boundary between an upper flange portion of said bracket and is welded to the inner panel of said roof rail and the projecting portion of said bracket.

5. A structure for attaching an assist grip for an automobile according to claim 1, wherein said bracket includes an expanded portion which expands toward the ceiling member and is formed along an edge line between a lower flange portion of said bracket and the projecting portion of said bracket.

6. A structure for attaching an assist grip for an automobile according to claim 1, wherein the inner panel of said roof rail has a second opening, and wherein the first opening is formed substantially coaxially with the second opening.

7. A structure for attaching an assist grip for an automobile according to claim 1, wherein the connection portions are nuts which are welded to said bracket.

* * * * *